(12) United States Patent
Lee et al.

(10) Patent No.: US 7,450,177 B2
(45) Date of Patent: Nov. 11, 2008

(54) APPARATUS AND METHOD TO CONTROL CAPTION POSITIONING

(75) Inventors: Jang-woo Lee, Seoul (KR); Sang-hak Lee, Seoul (KR)

(73) Assignee: Samsung Electronics Co., Ltd, Suwon-si (KR)

(*) Notice: Subject to any disclaimer, the term of this patent is extended or adjusted under 35 U.S.C. 154(b) by 817 days.

(21) Appl. No.: 10/902,159

(22) Filed: Jul. 30, 2004

(65) Prior Publication Data

US 2005/0041146 A1 Feb. 24, 2005

(30) Foreign Application Priority Data

Aug. 20, 2003 (KR) .................... 10-2003-0057503

(51) Int. Cl.
*H04N 7/08* (2006.01)
(52) U.S. Cl. .................. 348/468; 348/465; 348/461; 348/563; 348/913; 348/473; 348/589; 348/569
(58) Field of Classification Search .................. 348/468, 348/465, 461, 473, 569, 561, 563, 564, 565, 348/589, 913, 446
See application file for complete search history.

(56) References Cited

U.S. PATENT DOCUMENTS

| | | | | |
|---|---|---|---|---|
| 5,546,131 | A | * | 8/1996 | Terry .......................... 348/564 |
| 6,002,797 | A | * | 12/1999 | Mori et al. .................. 382/173 |
| 6,707,504 | B2 | * | 3/2004 | Chung ........................ 348/569 |
| 2001/0009445 | A1 | | 7/2001 | Chung |

FOREIGN PATENT DOCUMENTS

| | | |
|---|---|---|
| CN | 1139338 | 1/1997 |
| JP | 04-306979 | 10/1992 |
| JP | 04-321387 | 11/1992 |
| JP | 05-292401 | 11/1993 |
| JP | 06-326982 | 11/1994 |
| JP | 09-181994 | 7/1997 |
| JP | 11-8799 | 1/1999 |
| KR | P1995-703254 | 8/1995 |
| KR | P1998-57258 | 9/1998 |

OTHER PUBLICATIONS

Chinese Office Action dated Jul. 28, 2006 issued in CN 200410056915.

* cited by examiner

*Primary Examiner*—David L Ometz
*Assistant Examiner*—Jean W Désir
(74) *Attorney, Agent, or Firm*—Stanzione & Kim, LLP

(57) ABSTRACT

An apparatus and a method that controls a position of a caption. The apparatus includes: a caption processing unit, which identifies a non-signal area (B) including the caption using a control signal, identifies an image data area (A having the same size as the non-signal area (B), on a screen, and displays caption data of the non-signal area (B) on the image data area (A); a controller, which outputs a control signal positioning the captions to be lost in an enlarged presentation mode on the screen; and a signal processing unit, which performs image signal processing so that the caption data is displayed with predetermined images on the image data area (A).

8 Claims, 7 Drawing Sheets

(a)  (b)

APPARATUS AND METHOD TO CONTROL CAPTION POSITIONING

CROSS-REFERENCE TO RELATED APPLICATIONS

This application claims the priority of Korean Patent Application No. 2003-57503, filed on Aug. 20, 2003, in the Korean Intellectual Property Office, the disclosure of which is incorporated herein in its entirety by reference.

BACKGROUND OF THE INVENTION

1. Field of the Invention

The present general inventive concept relates to a display apparatus and method, and more particularly, to an apparatus and a method that controls a position of a caption, which allow positions of captions to overlap an image on a screen so as not to lose the captions when a display apparatus is set in an enlarged presentation mode.

2. Description of the Related Art

Since a width to height ratio (aspect ratio) of a 1.85:1 or 2.35:1 picture reproduced by a conventional wide screen method is different from that of a general 4:3 or 16:9 screen, a special signal processing method is necessary. To fit the 1.85:1 or 2.35:1 picture on the 4:3 or 16:9 screen, a letterbox operation must be performed. The letterbox operation places black bars at the top and bottom of a wide screen as shown in FIG. 1(a), and the aspect ratio of a presented image, including the black bars, becomes 4:3. That is, various images from movies can be viewed by appropriately placing the black bars on a general 4:3 TV screen and fitting the images on the screen.

A method of displaying a caption physically on an image, which has gone through the letterbox operation, includes a method of displaying a caption physically on the image and a method of displaying a caption on the black bar under an image. In the method of displaying a caption on a black bar under an image, if a presented image is enlarged (zoom out or full screen), the caption displayed on the black bar under the image is moved outside of the boundaries of a screen and cannot be viewed, as shown in FIG. 1(b). After the presented image is enlarged, the caption can be viewed by shifting the image upward. However, when the presented image is viewed in a full screen mode, the caption cannot be viewed because there is no room for the display to be shifted.

SUMMARY OF THE INVENTION

The present general inventive concept provides an apparatus and a method that controls a position of a caption, which allow positions of captions to overlap an image on a screen so as not to lose the captions when a display apparatus is set in an enlarged presentation mode.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a display apparatus that controls a position of a caption, the apparatus including a caption processing unit, which identifies a non-signal area (B) including the caption using a control signal, identifies an image data area (A), which is of the same size as the non-signal area (B), on a screen, and displays caption data of the non-signal area (B) on the image data area (A); a controller, which outputs a control signal positioning the captions to be lost in an enlarged presentation mode on the screen; and a signal processing unit, which performs image signal processing so that the caption data is displayed with predetermined images on the image data area (A).

The caption processing unit may include: a multiplier, which multiplies data of the non-signal area (B) including the caption data by a predetermined coefficient $\alpha$; and an adder, which adds the data of the non-signal area (B) multiplied by the predetermined coefficient $\alpha$ and data of the image data area (A).

The caption processing unit may include: a comparator, which determines a caption area and a non-signal area by comparing the data of the non-signal area (B) including the caption and a predetermined reference value; and an adder, which adds the data of the non-signal area (B) including the caption, in which the caption area and the non-signal area are determined, and data of the image data area (A).

The enlarged presentation mode received by the controller may be one of a zoom out mode and a full screen mode.

The foregoing and/or other aspects and advantages of the present general inventive concept may also be achieved by providing a method of operating a display apparatus that controls a position of a caption, the method including: if an enlarged presentation mode signal is received, identifying a non-signal area (B) including the caption on a display screen; multiplying data of the non-signal area (B) including the caption by a predetermined coefficient $\alpha$; identifying the image data area (A), which is of the same size as the non-signal area (B), on the display screen; adding the data of the non-signal area (B) multiplied by the predetermined coefficient $\alpha$ and data of the image data area (A); and displaying the caption on the image data area (A).

The enlarged presentation mode in the identifying a non-signal area (B) operation may be one of a zoom out mode and a full screen mode.

The foregoing and/or other aspects and advantages of the present general inventive concept may also be achieved by providing a method of operating a display apparatus that controls a position of a caption, the method including: if an enlarged presentation mode signal is received, identifying a non-signal area (B) including the caption on a display screen; determining a caption area and a non-signal area by comparing the data of the non-signal area (B) including the caption and a predetermined reference value; identifying an image data area (A), which is of the same size as the non-signal area (B), on the display screen; adding the data of the non-signal area (B) and data of the image data area (A); and displaying the caption on the image data area (A).

The enlarged presentation mode in the identifying a non-signal area (B) operation may be one of a zoom out mode and a full screen mode.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
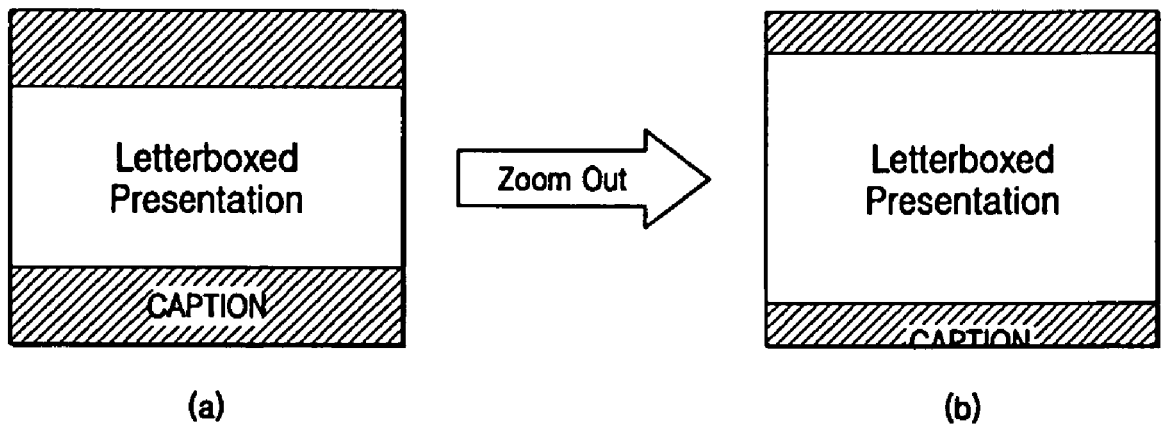
FIG. 1 illustrates a conventional ordinary letterboxed presentation and a conventional enlarged letterboxed presentation.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
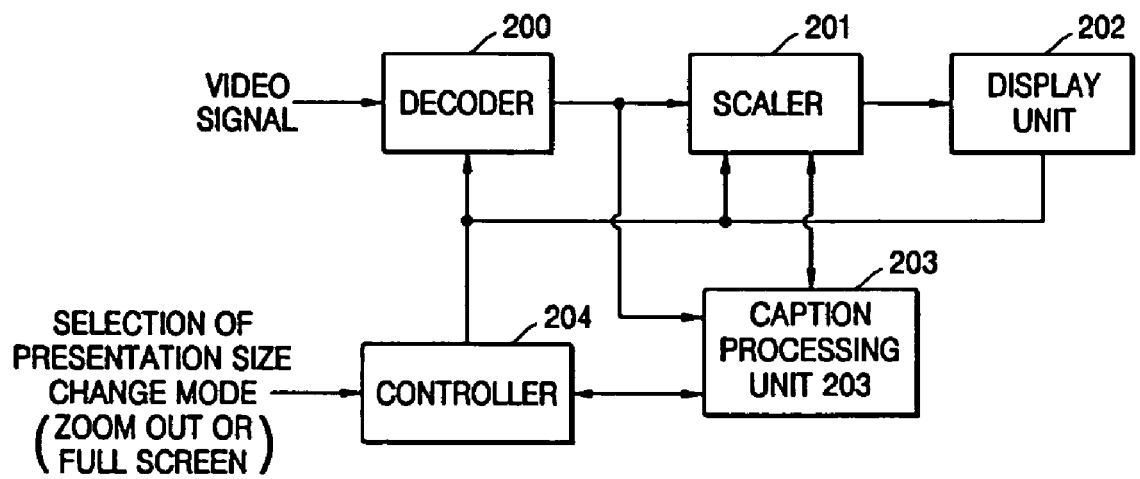
FIG. 2 is a block diagram of an apparatus that controls a position of a caption according to an exemplary embodiment of the present general inventive concept.
Figure 2A:
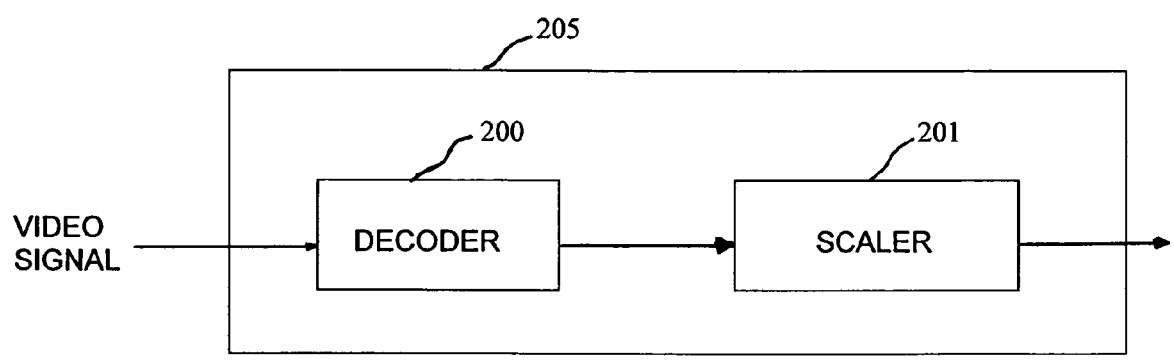
FIG. 2(a) illustrates a signal processing unit used in the apparatus of FIG. 2, according to an embodiment of the present general inventive concept.

FIG. 2 is a block diagram of an apparatus that controls a position of a caption according to an exemplary embodiment of the present general inventive concept. Referring to FIG. 2, the apparatus includes a decoder 200, a scaler 201, a display unit 202, a caption processing unit 203, and controller 204. FIG. 2(a) is a block diagram of a signal processing unit 205 including the decoder 200 and the scaler 201 combined as one unit.

Figure 3:
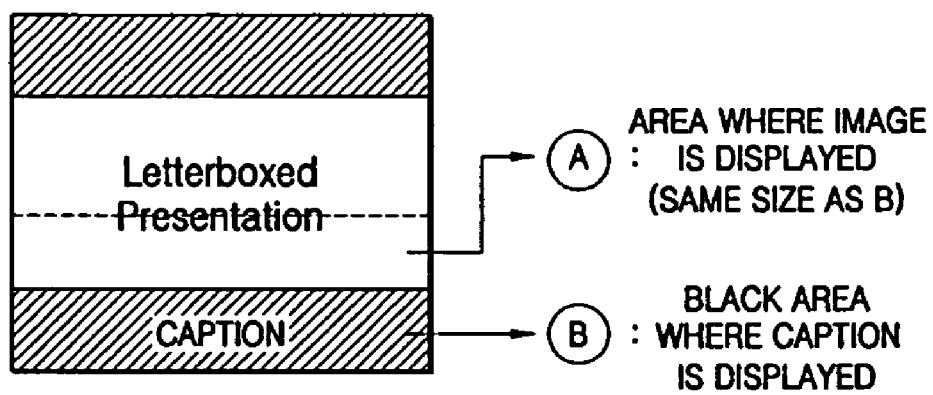
FIG. 3 illustrates presentations whose sizes are changed by the apparatus shown in FIG. 2.
Figure 3:
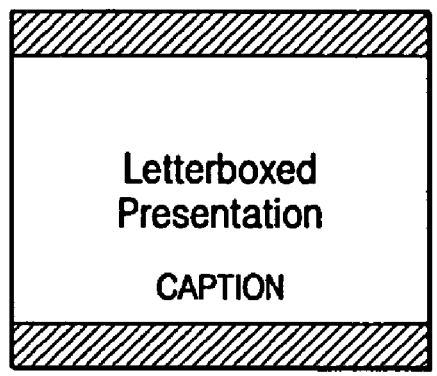
Figure 3:
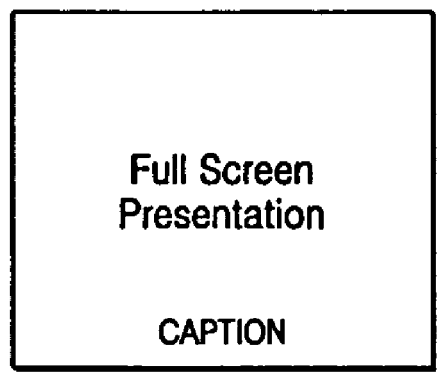

FIG. 3 illustrates presentations whose sizes are changed by the apparatus shown in FIG. 2.

Figure 4:
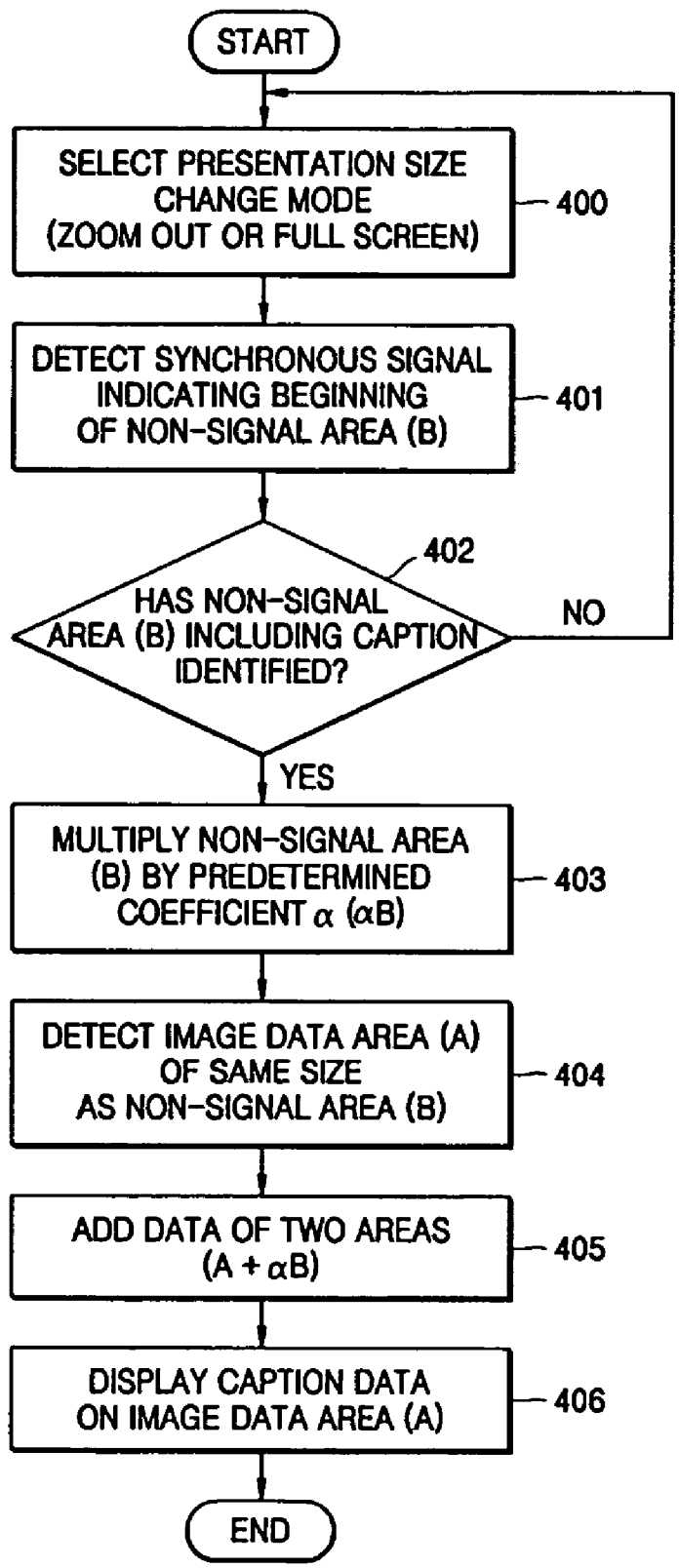
FIG. 4 is a flowchart of a method of controlling a position of a caption according to an exemplary embodiment of the present general inventive concept.

FIG. 4 is a flowchart of a method of controlling a position of a caption according to an exemplary embodiment of the present general inventive concept. Referring to FIG. 4, the method includes: selecting a presentation size change mode (zoom out or full screen) in operation 400; detecting a synchronous signal indicating the beginning of a non-signal area (B) in operation 401; determining whether the non-signal area (B) including a caption has been identified in operation 402; multiplying the non-signal area (B) by a predetermined coefficient α in operation 403; detecting an image data area (A), which has the same size as the non-signal area (B) in operation 404; adding the data of the non-signal area (B) multiplied by the predetermined coefficient α and data of the image data area (A) in operation 405; and displaying the caption on the image data area (A) in operation 406.

Figure 5:
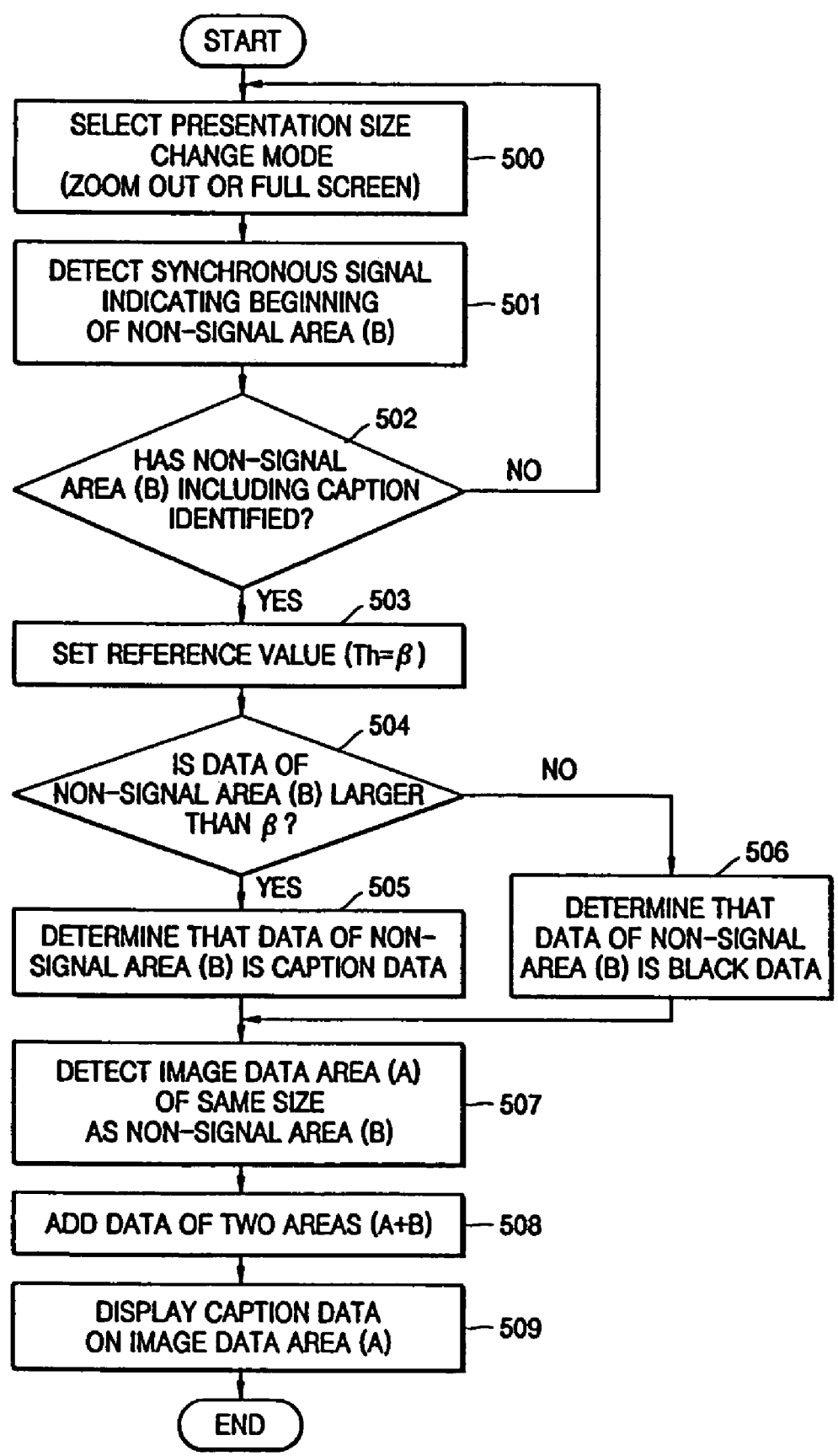
FIG. 5 is a flowchart of a method of controlling a position of a caption according to another exemplary embodiment of the present general inventive concept.

FIG. 5 is a flowchart of a method of controlling a position of a caption according to another exemplary embodiment of the present general inventive concept. Referring to FIG. 5, the method includes: selecting a presentation size change mode (zoom out or full screen) in operation 500; detecting a synchronous signal indicating the beginning of a non-signal area (B) in operation 501; determining whether the non-signal area (B) including a caption has been identified in operation 502; setting a reference value β in operation 503; determining whether data of the non-signal area (B) is larger than the reference value β in step 504; if the data of the non-signal area (B) is larger than the reference value β, determining that the data of the non-signal area (B) is caption data in operation 505; if the data of the non-signal area (B) is not larger than the reference value β, determining that the data of the non-signal area (B) is black (non-signal) data in operation 506; detecting an image data area (A having the same size as the non-signal area (B) in operation 507; adding the data of the non-signal area (B) and data of the image data area (A) in operation 508; and displaying the caption on the image data area (A) in operation 509.

Referring to FIGS. 2 through 2(b), 3 and 4, an apparatus that controls a position of a caption and a method of controlling a position of a caption according to exemplary embodiments of the present invention will now be described in detail.

It is presumed that the apparatus according to the present general inventive concept receives external video signals, an aspect ratio of the video signals is 2.35:1 or 1.85:1 when reproducing the video signals, and an aspect ratio of a screen of a display device is 4:3 or 16:9. Also, it is presumed that a caption is displayed on a black portion above or below a letterboxed presentation as shown in FIG. 3(a).

The decoder 200 decodes an input image signal of an aspect ratio of 2.35:1 or 1.85:1. The scaler 201 scales the decoded image signal and caption data to fit the aspect ratio of 4:3 or 16:9. The display unit displays the scaled image signal and caption data. The caption processing unit 203 identifies a non-signal area (B) including the caption using a control signal, identifies an image data area (A) having the same size as the non-signal area (B), on a screen, and displays caption data of the non-signal area (B) on the image data area (A). The controller 204 controls operation of all units. The decoder 200 and the scaler 201 may be provided together in a signal processing unit 205 as illustrated in FIG. 2(a).

Figure 2B:
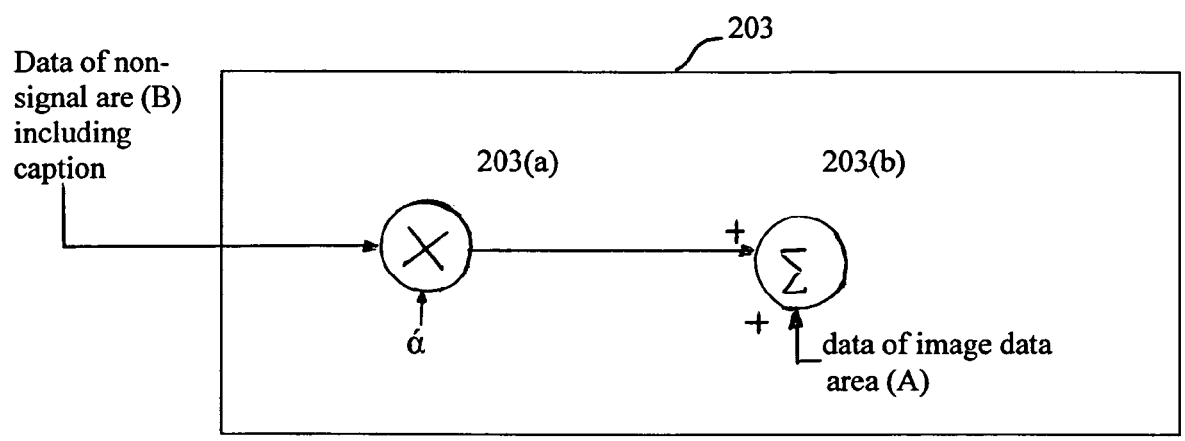
FIG. 2(b) illustrates a caption processing unit used in the apparatus of FIG. 2, according to an embodiment of the present general inventive concept.

As illustrated in FIG. 2(b), caption processing unit 203 may include a multiplier 203(a) and an adder 203(b). The multiplier 203(a) multiplies data of the non-signal area (B) including a caption by a predetermined coefficient α. During this operation, the color of the non-signal area (B) becomes almost black by multiplying the data of the non-signal area (B) by the predetermined coefficient α since the color of the non-signal area (B) other than the caption may not be pure black. The adder 203(b) adds the data of the non-signal area (B) multiplied by the predetermined coefficient α and data of the image data area (A).

Referring to FIG. 4, a user selects a presentation size change mode (zoom out or full screen), and the controller 204 receives the selected mode in operation 400. If the controller 204 receives the presentation size change mode selection signal, the controller 204 controls the positioning of the caption by controlling the caption processing unit 203.

The caption processing unit 203 detects a synchronous signal of a beginning zone of the non-signal area (B) under control of the controller 204 in operation 401.

If the synchronous signal of the non-signal area (B) is being detected, the caption processing unit 203 detects the non-signal area (B) including the caption, and the controller 204 determines whether the non-signal area (B) including the caption has been identified in operation 402.

If the non-signal area (B) including the caption has been identified, the caption processing unit 203 multiplies the non-signal area (B) by a predetermined coefficient α in operation 403. The multiplier 203(a) multiplies data of the non-signal area (B) including the caption by the predetermined coefficient α. In this operation, the color of the non-signal area (B) becomes almost black by multiplying the data of the non-signal area (B) by the predetermined coefficient α since the color of the non-signal area (B) other than the caption may not be pure black.

The caption processing unit 203 detects an image data area (A), which is of the same size as the non-signal area (B), in operation 404. The image data area (A) has the same size as the non-signal area (B) and is placed just above the non-signal area (B) as shown in FIG. 3(a).

When the image data area (A) is detected, the adder 203(b) adds the data of the non-signal area (B) multiplied by the predetermined coefficient α and data of the image data area (A) in operation 405.

The caption processing unit 203 outputs the caption data on the image data area (A) to the display unit 202, and the display unit 202 displays the caption data on the image data area (A) in operation 406. FIG. 3(b) shows a screen where the caption data is displayed when a zoom out mode of the presentation size change mode is selected, and FIG. 3(c) shows a screen where the caption data is displayed when a full screen mode of the presentation size change mode is selected.

Referring to FIGS. 2, 2(a), 2(c), 3, and 5, an apparatus that controls a position of a caption and a method of controlling a position of a caption according to another exemplary embodiment of the present general inventive concept will now be described in detail.

It is presumed that the apparatus according to the present general inventive concept receives external video signals, an aspect ratio of the video signals is 2.35:1 or 1.85:1 when reproducing the video signals, and an aspect ratio of a screen of a display device is 4:3 or 16:9. Also, it is presumed that a caption is displayed on a black portion above or below a letterboxed presentation as shown in FIG. 3(a).

The decoder 200 decodes an input image signal of 2.35:1 or 1.85:1. The scaler scales the decoded image signal and caption data to fit the aspect ratio of 4:3 or 16:9. The display unit displays the scaled image signal and caption data. The caption processing unit 203 identifies a non-signal area (B) including the caption using a control signal, identifies an image data area (A), which is of the same size as the non-signal area (B), on a screen, and displays caption data of the non-signal area (B) on the image data area (A). The controller 204 controls operation of all units illustrated in FIG. 2. In this embodiment, the decoder 200 and the scaler 201 may be provided together in the signal processing unit 205 as illustrated in FIG. 2(a).

Figure 2C:
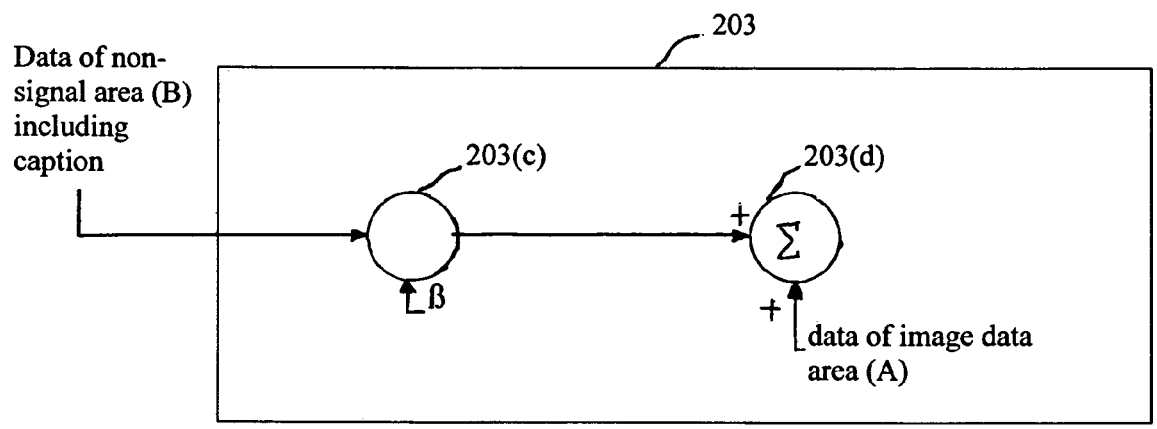
FIG. 2(c) illustrates another caption processing unit used in the apparatus of FIG. 2, according to an embodiment of the present general inventive concept.

As illustrated in FIG. 2(c), the caption processing unit 203 of this embodiment may include a comparator 203(c) and an adder 203(d). The comparator 203(c) compares the data of the non-signal area (B) including the caption and a predetermined reference value and determines a caption area and a non-signal area within the non-signal area (B). The adder 203(d) adds the data of the non-signal area (B) including the caption, in which the caption area and the non-signal area are determined and data of the image data area (A).

A user selects a presentation size change mode (zoom out or full screen), and the controller 204 receives the selected mode in operation 500. If the controller 204 receives the presentation size change mode selection signal, the controller 204 controls the positioning of the caption by controlling the caption processing unit 203.

The caption processing unit 203 detects a synchronous signal of a beginning zone the non-signal area (B) under control of the controller 204 in step 501.

If the synchronous signal of the non-signal area (B) is being detected, the caption processing unit 203 detects the non-signal area (B) including the caption, and the controller 204 determines whether the non-signal area (B) including the caption has been identified in operation 502.

If the non-signal area (B) including the caption has been identified, the caption processing unit 203 sets a reference value β in operation 503. Here, the reference value β is a threshold value for determining the caption area and the non-signal area from the non-signal area (B) including the caption.

The comparator 203(c) compares whether data of the non-signal area (B) is larger than the reference value β in operation 504.

If the data of the non-signal area (B) is larger than the reference value β in operation 504, the caption processing unit 203 determines that the data of the non-signal area (B) is caption data in step 505.

If the data of the non-signal area (B) is not determined to be larger than the reference value β in operation 504, the caption processing unit 203 determines that the data of the non-signal area (B) is black (non-signal) data in operation 506.

Then, the caption processing unit 203 detects an image data area (A), which is of the same size as the non-signal area (B) in operation 507. The image data area (A) is of the same size as the non-signal area (B) and is placed just above the non-signal area (B) as shown in FIG. 3(a).

When the image data area (A) is detected, the adder 203(d) adds the data of the non-signal area (B) and data of the image data area (A) in operation 508.

The caption processing unit 203 outputs the caption data on the image data area (A) to the display unit 202, and the display unit 202 displays the caption data on the image data area (A) in operation 509. FIG. 3(b) shows a screen where the caption data is displayed when a zoom out mode of the presentation size change mode is selected, and FIG. 3(c) shows a screen where the caption data is displayed when a full screen mode of the presentation size change mode is selected.

As described above, according to the present general inventive concept, positions of captions overlap an image on a screen so as not to lose the captions when a display apparatus is set in an enlarged presentation mode. Therefore, a process where a user is required to directly position the caption to view the caption after the user selects the enlarged presentation mode is not required.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus that controls a position of a caption, the apparatus comprising:

a caption processing unit, which identifies a non-signal area including the caption using a control signal, identifies an image data area having the same size as the non-signal area on a screen, and displays caption data of the non-signal area on the image data area;

a controller, which outputs a control signal positioning the captions in an enlarged presentation mode on the screen; and a signal processing unit, which performs image signal processing so that the caption data is displayed with predetermined images on the image data area wherein the caption processing unit comprises:

a multiplier, which multiplies data of the non-signal area including the caption data by a predetermined coefficient; and an adder, which adds the data of the non-signal area multiplied by the predetermined coefficient a and data of the image data area.

2. The apparatus of claim 1, wherein the enlarged presentation mode received by the controller is one of a zoom out mode and a full screen mode.

3. A display apparatus that controls a position of a caption, the apparatus comprising:

a caption processing unit, which identifies a non-signal area including the caption using a control signal, identifies an image data area having the same size as the non-signal area on a screen, and displays caption data of the non-signal area on the image data area;

a controller, which outputs a control signal positioning the captions in an enlarged presentation mode on the screen; and a signal processing unit, which performs image signal processing so that the caption data is displayed with predetermined images on the image data area, wherein the caption processing unit comprises:

a comparator, which determines a caption area and a non-signal area by comparing the data of the non-signal area including the caption and a predetermined reference value; and an adder, which adds the data of the non-signal area including the caption, in which the caption area and the non-signal area are determined and data of the image data area.

4. The apparatus of claim 3, wherein the enlarged presentation mode received by the controller is one of a zoom mode and a full screen mode.

5. A method of operating a display apparatus that controls a position of a caption, the method comprising:

if an enlarged presentation mode signal is received, identifying a non-signal area including the caption on a display screen;

multiplying data of the non-signal area including the caption by a predetermined coefficient $\alpha$;

identifying an image data area having the same size as the non-signal area, on the display screen;

adding the data of the non-signal area multiplied by the predetermined coefficient $\alpha$ and data of the image data area; and displaying the caption on the image data area.

6. The method of claim 5, wherein the enlarged presentation mode of the enlarged presentation mode signal received is one of a zoom out mode and a full screen mode.

7. A method of operating a display apparatus that controls a position of a caption, the method comprising:

if an enlarged presentation mode signal is received, identifying a non-signal area (B) including the caption on a display screen;

determining a caption area and a non-signal area by comparing the data of the non-signal area (B) including the caption and a predetermined reference value;

identifying an image data area (A) having the same size as the non-signal area (B), on the display screen;

adding the data of the non-signal area and data of the image data area; and displaying the caption on the image data area.

8. The method of claim 7, wherein the enlarged presentation mode of the enlarged presentation mode signal received is one of a zoom out mode and a full screen mode.

* * * * *